United States Patent [19]

Peiffer et al.

[11] Patent Number: 4,627,926

[45] Date of Patent: Dec. 9, 1986

[54] THERMALLY STABLE BOREHOLE FLUIDS

[75] Inventors: Dennis G. Peiffer, East Brunswick; Robert D. Lundberg, Bridgewater, both of N.J.; Lawrence P. Sedillo, Houston; John Newlove, Kingwood, both of Tex.

[73] Assignee: Exxon Research and Engineering Company, Florham Park, N.J.

[21] Appl. No.: 651,900

[22] Filed: Sep. 19, 1984

[51] Int. Cl.$^4$ .................. E21B 43/00; E21B 43/26
[52] U.S. Cl. ................................ 252/8.55 R; 166/308
[58] Field of Search ............. 252/8.55 R, 8.55 C, 252/8.5 A, 8.5 C; 166/308

[56] References Cited
U.S. PATENT DOCUMENTS

| | | | |
|---|---|---|---|
| 4,046,197 | 9/1977 | Gruesbeck et al. | 252/8.5 X |
| 4,225,445 | 9/1980 | Dixon | 252/8.55 |
| 4,336,145 | 6/1982 | Briscoe | 252/8.55 |
| 4,460,758 | 7/1984 | Peiffer et al. | 526/287 |
| 4,490,261 | 12/1984 | Heilweil | 252/8.55 X |

*Primary Examiner*—Herbert B. Guynn
*Attorney, Agent, or Firm*—Richard E. Nanfeldt

[57] ABSTRACT

A method of completing a subterranean formation of an oil or gas well to increase the recovery of hydrocarbons from the producing reservoir which comprises dissolving about 0.25 to about 20 lb/bbl of a water soluble terpolymer in an aqueous solution to viscosify said aqueous solution and pumping said aqueous solution with said water base terpolymer dissolved therein into said well to control the sub-surface pressures of said well, wherein said terpolymer has the formula:

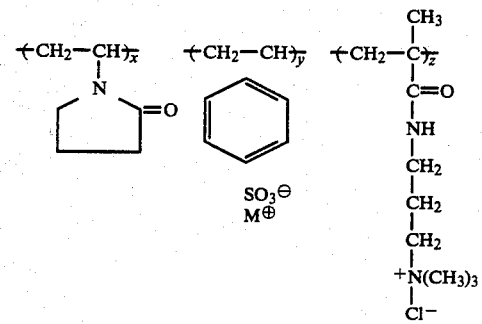

wherein x is about 70 to about 98 mole %, y is about 1 to about 15 mole %, z is about 1 to about 15 mole %, wherein y and z are less than 60 mole %, and M is selected from the group consisting of amines and a metallic cation being selected from the group consisting of lead, iron, aluminum, Groups IA, IIA, IB and II of the Periodic Table of Elements.

8 Claims, No Drawings

THERMALLY STABLE BOREHOLE FLUIDS

FIELD OF THE INVENTION

A new family of thermally stable borehole fluids based on terpolymers of N-vinyl-2-pyrrolidonesodium styrene sulfonate-methacrylamidopropyltrimethylammonium chloride is described as an improved water-based completion or workover fluids. The present invention relates to the use of these terpolymer materials to minimize the recovery of hydrocarbons from the producing reservoir. The terpolymers have about 70 to 98 mole % N-vinyl-2-pyrrolidone units, about 1 to about 15 mole % sodium styrene sulfonate units and about 1 to about 15 mole % methacrylamidopropyltrimethylammonium chloride units. Normally, the latter two units comprise less than 30 mole % of the total polymer composition.

The borehole fluids formed from these polymeric materials exhibit improved low and high temperature rheological properties as compared to previously known borehole fluids. The improved high temperature performance of these polymers, especially in acidic environments, is due to the hydrolytic stability of the N-vinyl-2-pyrrolidone units.

BACKGROUND OF THE INVENTION

In the field of drilling in the exploration for oil and gas, an important component is that of the formulation of borehole fluids.

A completion fluid can be broadly defined as any borehole fluid placed across the producing zone prior to bring a new well in. Workover fluids are used during remedial work on an already existing well which has been in production for a period of time.

The need to control subsurface pressure can create a problem in the design of a fluid. If the formation is not too high, brines can be used, utilizing solution weight. If the formation pressures are excessive, higher density brines have been developed, or alternatively solid weighing material will have to be added to increase the density of the fluid, in both cases necessitating the use of viscosifiers and suspending agents.

The borehole fluid must be compatible with the open hole section of the wellbore. Transportation of moveable solids is important from the standpoint of cleaning out debris in the well bore, or gravel packing and normally requires the addition of viscosifiers to the fluid.

In many cases, solids suspension is required to allow working time when the fluid is static, or to leave as a packer fluid, and fluid must be able to perform all of its functions under downhole conditions of temperature and pressure.

Clear brines as completion and workover fluids has risen sharply in recent years. This increase is attributed to the minimum damaging characteristics on reservoir rocks. Specially designed polymer/brine systems use polymers as a replacement for bentonite or other clays for viscosity, weight support and fluid loss control.

Polymers used in the industry perform better at lower brine concentrations and solids have to be used as weighing materials to increase density.

As alluded to previously, a very desirable change in the formulation of a borehole fluid would be the elimination of all added particulates. One practical approach to this problem is to formulate a borehole fluid that is clear, homogeneous, dense, single phase and possesses the appropriate viscosity requirements (in general, 10 to 100 cps). Therefore, a borehole fluid containing principally a polymeric viscosifier in a high concentration brine (weighting agent) could meet the above-stated requirements. Such a borehole fluid would be quite economical since some processing steps (and materials) are eliminated. For instance, brine can be obtained directly at the drill site.

However, it should be pointed out that the ability of macromolecules to effectively viscosify a high ionic strength solution is generally poor, since the dimensions of the polymer chains tend to collapse under these conditions. This is especially true for polyelectrolytes (i.e., homogeneous-charged polymers). A collapse in the dimensions of the chain results in significant loss in viscosity. Therefore, it is imperative for successful use of polymers in high ionic strength solutions that chain expansion rather than contraction should take place.

In copending U.S. Ser. No. 562,163, filed Dec. 6, 1983, it was observed that polymeric materials composed of N-vinyl-2-pyrrolidone (NV2P), sodium styrene sulfonate (SSS) and methacrylamidopropyltrimethylammonium chloride (MAPTAC) were observed to enhance the viscosity of aqueous solutions containing high levels of salt, acid or, base. These materials meet the requirements for producing a homogeneous, single phase, high density, water-based drilling mud. The N-vinyl-2-pyrrolidone units impart a substantially improved high temperature stability to the drilling fluid.

Another method of well completion and workover is the use of acid (preferably hydrochloric acid) to dissolve or remove damage in and around the well bore. Transportation of solids is important from the standpoint of cleaning out debris from the well bore, or gravel packing. This normally requires the addition of viscosifiers to the fluid. The viscosifiers have a second function of retarding the acid reaction rate so that the acid may more evenly react with the formation and its damage.

For completion and workover fluids, the majority of the polymers being commercially used, for viscosity and suspension, are confined to hydroxy ethyl cellulose polymers (HEC) and xanthan gum (XC) which have a use temperature limit of 250° F.

HEC polymers are derivatives of the cellulose polymer modified to impart water solubility, HEC will not suspend solids. Xanthan gums are high molecular weight polymers produced by bacterial, XC polymer is an excellent viscosifier and suspending agent. The HEC and especially the XC polymers, perform best in lower density brines, such as saturated sodium chloride or 10.7 to 11 lb/gal. calcium chloride brine.

For the higher density brines, a percentage of the water is tied up by the salts. This limits the ability of the polymers to yield properly. Brines up to 11.0 lb/gal. $CaCl_2$ approaches the cost performance limit for making one of these systems. HEC will viscosify heavier brines, but the amount required increases. XC polymers become ineffective as density increases beyond 12 lb/gal.

This invention describes a process for maximizing the recovery of hydrocarbon oils from the producing reservoir of an oil or gas well by adding a sufficient quantity of N-vinyl-2-pyrrolidone-based polyampholyte terpolymers to an aqueous solution to viscosify the aqueous solution so as to form an improved thermally stable borehole fluid. The resulting polymer-modified borehole fluid displays rheological properties which are in a desirable range for thermally stable borehole fluids.

The types of N-vinyl-2-pyrrolidone-based polyampholytes that are envisioned in the present invention include N-vinyl-2-pyrrolidone as the nonionic monomer unit and the following anionic and cationic species:

Anionic: 2-acrylamido-2-methylpropane sulfonic acid, sodium styrene sulfonate, (meth)acrylic acid, 2-sulfoethylmethacrylate and the like.

Cationic: Methacrylamidopropyltrimethylammonium chloride, dimethyldiallylammonium chloride, diethyldiallylammonium chloride, 2-methacryloxy-2ethyltrimethylammonium chloride, trimethylmethacryloxyethylammonium methosulfate, 2-acrylamido-2-methylpropyltrimethylammonium chloride, vinylbenzyltrimethylammonium chloride and the like.

These monomers possess the appropriate water solubility so that polymerization can take place.

The preferred species of the instant invention is low to moderate charge density N-vinyl-2-pyrrolidone based polyampholytes with approximately 70 to about 98 mole % ionic groups. A 1:1 molar ratio of anionic and cationic is not required for effective utilization of this polymer. It is found that these terpolymers are soluble (low charge density) or readily dispersible (moderate charge density) in fresh water systems. Homogeneous, clear solutions form with the addition of soluble acid, base, or salt showing that the polymer is readily soluble in these solutions. In addition, the viscosity increases with the addition of these solutes. As a consequence, these polymers are extremely effective viscosifiers in a high ionic strength, water-based borehole fluids, even at relatively low levels. Moreover, the hydrolytic stability of the N-vinyl-2-pyrrolidone moieties imparts a substantially improved high temperature stability to the water-based borehole fluid.

Aqueous solutions of the terpolymers of the instant invention can also be used as fracturing fluids.

Subterranean formations are fractured for various reasons. For example, the formation around a well may be fractured to increase the permeability. Such an increase in permeability enables fluids to be produced from the subterranean formation at a greater rate with the same pressure drop.

Fracturing a subterranean formation by applying hydraulic pressure has been demonstrated to be economical and practical. Hydraulic fracturing is improved by a fracturing liquid which has the following characteristics:

(1) The fracturing liquid is capable of holding a propping material, such as sand, in suspension while being pumped down the well and into fractures which will be formed in the formation; but it also is capable of depositing the propping material in the fractures;

(2) It has a viscosity low enough to be pumped down the well, and it allows hydraulic pressure to be generated against the formation;

(3) It flows into the fractures formed in the formation and enables extending the fractures, but affords minimal loss of the fracturing liquid into the pores of the formation;

(4) It does not plug the pores of the formation or reduce the permeability of the formation permanently.

Most fracturing liquids fail in at least one of these characteristics. Usually, the fracturing liquids have a high rate of leak-off into the formation initially and when fractures expose virgin formation surfaces. Thus, a high volumetric rate of flow or prolonged flow of the fracturing liquid is required to fracture successfully the formation.

The terpolymers of the instant invention provide a method of fracturing a subterranean formation which prevents a high rate of leak-off of the fracturing liquid into the formation.

The terpolymer of the instant invention provides a method of fracturing a subterranean formation which allows controllably thickening the fracturing liquid in situ and controllably lowering the viscosity of the fracturing liquid in situ without depending on time or temperature effects upon complex additives, or on multiple injections of different fluids.

In accordance with the invention, a subterranean formation penetrated by a well is fractured with water containing a quantity sufficient to create a shear thickening liquid composition of a water soluble terpolymer.

SUMMARY OF THE INVENTION

The present invention relates to a new family of borehole fluids based on terpolymers of N-vinyl-2-pyrrolidone-sodium styrene sulfonate-methacrylamidopropyltrimethylammonium chloride. These terpolymer materials, when added to aqueous solutions, viscosify the aqueous solution to form a borehole fluid. The terpolymers have about 70 to 98 mole % N-vinyl-2-pyrrolidone units, about 1 to about 15 mole % sodium styrene sulfonate units and about 1 to about 15 mole % methacrylamidopropyltrimethylammonium chloride units. Normally, the latter two units comprise less than 30 mole % of the total polymer composition. A soluble, low molecular weight acid, base or salt can be added to the borehole fluid which causes the rheological properties of the borehole fluid to be markedly enhanced.

A method of completing a subterranean formation of an oil or gas well to increase the recovery of hydrocarbons from the producing reservoir which comprises dissolving about 0.25 to about 20 lb/bbl of a water soluble terpolymer in an aqueous solution to viscosify said aqueous solution and pumping said aqueous solution with said water base terpolymer dissolved therein into said well to control the subsurface pressures of said well, wherein said terpolymer has the formula:

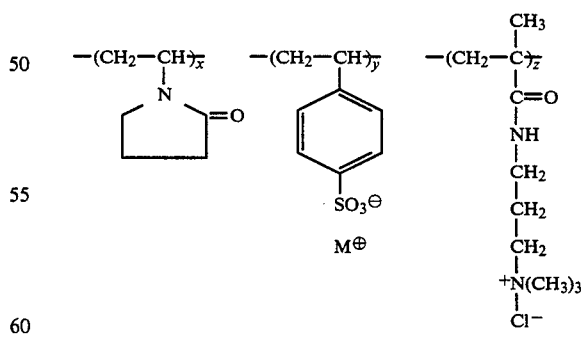

A method of fracturing a subterranean formation of a gas or oil well comprises dissolving about 0.25 to about 20 lb/bbl of a water soluble terpolymer into an aqueous solution to viscosify said aqueous solution and pumping said aqueous solution with terpolymer dissolved therein into said well to apply hydraulic pressure to said formation wherein said terpolymer has the formula:

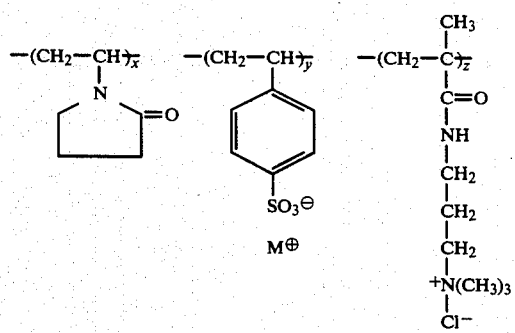
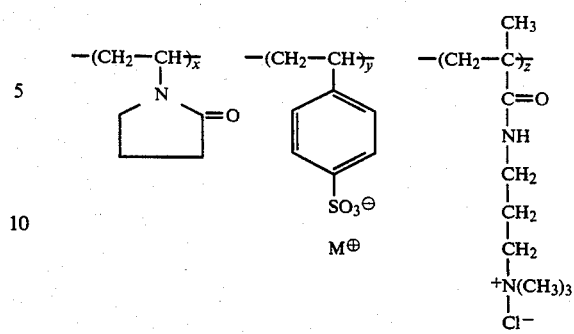

GENERAL DESCRIPTION

The present invention describes a new class of borehole fluids used in oil or gas well production, wherein these borehole fluids are intermolecular complexes, i.e., polyampholytes containing primarily N-vinyl-2-pyrrolidone with low to moderate concentrations of anionic and cationic groups. These latter two units are not necessarily present in a 1:1 molar ratio. Typically, the cationic monomer unit is methacrylamidopropyltrimethylammonium chloride (MAPTAC) and the anionic monomer unit is sodium styrene sulfonate (SSS). However, many water soluble anionic and cationic monomer units can be substituted for MAPTAC and SSS units. It is the placement of these oppositely-charged species onto the polymer chain that imparts substantially different physical properties to these materials, as compared to homogeneous-charged macromolecules, i.e., polyelectrolytes.

The terpolymers used as the borehole fluids are formed by a free radical copolymerization process. The principal monomer used in the free radical aqueous solution copolymerization process is N-vinyl-2-pyrrolidone monomer, which is copolymerized with an anionic monomer (typically, sodium styrene sulfonate) and a cationic monomer (typically, methacrylamidopropyltrimethylammonium chloride).

A typical water-based borehole fluid, as envisioned by the instant invention, comprises water in which sufficient salt (such as iron-chloride, iron bromide and calcium bromide) and/or acid (such as HCl) is dissolved to give the desired fluid density, and about 0.25 to about 7.5 lb/bbl. of the N-vinyl-2-pyrrolidone-MAPTAC-SSS terpolymer. Higher levels of the terpolymer can be employed, but, it is not economically attractive.

The terpolymers of the instant invention are formed by a free radical terpolymerization process in an aqueous medium of an N-vinyl-2-pyrrolidone monomer, a sodium styrene sulfonate monomer and a methacrylamidopropyltrimethylammonium chloride monomer. The resultant water soluble terpolymer has the formula:

wherein x is about 70 to about 98 mole %, more preferably about 75 to about 95, and most preferably about 80 to about 90, y is about 1 to about 15 mole %, more preferably about 2 to about 12 and most preferably about 3 to about 10, and z is about 1 to about 15 mole %, more preferably about 2 to about 12, and most preferably about 8 to about 10, wherein y and z are less than 70 mole %, and M is an amine, or a metal cation selected from the group consisting of aluminum, iron, lead, Groups IA, IIA, IB and IIB of the Periodic Table of Elements.

The molecular weight as derived from intrinsic viscosities, for the terpolymers of N-vinyl-2-pyrrolidone/sodium styrene sulfonate/methacrylamidopropyltrimethylammonium chloride is about $10^3$ to about $5\times10^6$, more preferably about $10^4$ to about $2\times10^6$ and most preferably about $10^5$ to about $10^6$. The means for determining the molecular weights of the water soluble terpolymers from the viscosity of solutions of the terpolymers comprises the initial isolation of the water soluble terpolymers, purification and redissolving the terpolymers in water to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark Houwink relationship.

The water soluble terpolymers of N-vinyl-2-pyrrolidone/sodium styrene sulfonate/methacrylamidopropyltrimethylammonium chloride are formed by a conventional free radical terpolymerization in an aqueous medium which comprises the steps of forming a reaction solution of N-vinyl-2-pyrrolidone monomer, sodium styrene sulfonate monomer and methacrylamidopropyltrimethylammonium chloride monomer (50 wt. % solution in water) in distilled water, wherein the total monomer concentration is about 1 to about 40 grams of total monomer per 100 grams of water, more preferably about 5 to about 30, and most preferably about 10 to about 20; purging the reaction solution with nitrogen; adding base to the reaction solution to adjust the pH of the reaction solution to about 8.0 to 9.0; etc. sufficient acid to the reaction solution to adjust the pH of the reaction solution to about 4.5 to 5; heating the reaction solution to at least 55° C. while maintaining the nitrogen purge, adding sufficient free radical initiator to the reaction solution at 55° C. to initiate terpolymerization of the N-vinyl-2-pyrrolidone monomer, the sodium styrene sulfonate monomer, and the methacrylamidopropyltrimethylammonium chloride monomer; terpolymerizing said monomers of N-vinyl-2-pyrrolidone, sodium styrene sulfonate and methacrylamidopropyltrimethylammonium chloride at a sufficient temperature and for a sufficient period of time to form said water soluble terpolymer; and recovering said water soluble terpolymer from said reaction solution.

In general, the N-vinyl-2-pyrrolidone, anionic and cationic monomers are dissolved in a water phase in the presence of an initiator, wherein the temperature is sufficient to initiate polymerization. The resultant terpolymer is added to the borehole fluid formulation of about 0.25 to about 20 lb/bbl, more preferably 0.5 to about 7.5 lb/bbl and most preferably 1.0 to 5.0 lb/bbl. The borehole fluid can also contain about 0.1 to about 40 wt.% of an inorganic salt such as calcium chloride and/or about 0.01 to about 30 wt.% of an inorganic acid such as hydrochloric acid. In the case of the fracturing fluid, about 0.1 to about 15 lbs/bbl of a sand can be added to the fracturing fluid.

The total concentration of monomers in the water is about 1 to about 40 grams of total monomer per 100 grams of water, more preferably about 5 to about 30, and most preferably about 10 to about 20. Terpolymerization of the N-vinyl-2-pyrrolidone monomer, sodium styrene sulfonate monomer, and methacrylamidopropyltrimethylammonium chloride monomer is effected at a temperature of about 30 to about 90, more preferably at about 40 to about 70, and most preferably at about 50 to about 60 for a period of time of about 1 to about 24 hours, more preferably about 3 to about 10, and most preferably about 4 to about 8.

A suitable method of recovery of the formed water soluble terpolymer from the aqueous reaction solution comprises precipitation in acetone, methanol, ethanol and the like.

Suitable free radical initiators for the free radical terpolymerization of the N-vinyl-2-pyrrolidone monomers, the sodium styrene sulfonate monomer, and the methacrylamidopropyltrimethylammonium chloride monomer are selected from the group consisting of potassium persulfate, benzoyl peroxide, hydrogen peroxide, azobisisobutyronitrile and the like. The concentration of the free radical initiator is about 0.001 to about 2.0 grams of free radical initiator per 100 grams of total monomer, more preferably about 0.01 to about 1.0, and most preferably about 0.05 to about 0.1.

It should be pointed out that neither the mode of polymerization (solution, suspension, or emulsion polymerization technique and the like) nor the initiator is critical, provided that the method or the product of the initiation step does not inhibit production of the polyampholyte or chemically modify the initial molecular structure of the reacting monomers.

DESCRIPTION OF THE PREFERRED EMBODIMENTS

The following examples illustrate the present invention, without; however, limiting the same hereto.

EXAMPLE 1

A representative example for the synthesis of these terpolymers is outlined below.

Into a 1-liter, 4-neck flask add:
6.64 g MAPTAC (50% solution)
30 g N-vinyl-2-pyrrolidone
3.1 g sodium styrene sulfonate
300 ml. distilled water
1.0 ml. ammonium hydroxide We should emphasize at this time that the anionic and cationic monomers were added to the aqueous phase without attempting to form ion-pair comonomers that do not possess nonpolymerizable counterions.

The solution was purged with nitrogen gas for one hour to remove dissolved oxygen. As the nitrogen gas purging began, the solution was heated to 55° C. At this point, 0.05 g azobisisobutyronitrile was added to the solution. After 24 hours, the polymer was precipitated from solution with acetone. Subsequently, the resulting polymer was washed several times with a large excess of acetone and dried in a vacuum oven at 60° C. for 24 hours.

EXAMPLE 2

Presented in Tables I–VIII are representative data on the rheological properties of NV2P-SSS-MAPTAC terpolymer composed of approximately 90 mole % NV2P, 5 mole % MAPTAC and 5 mole % SSS dissolved in a variety of salt and acid environments. In all instances, the properties were measured initially at room temperature at 170 reciprocal seconds, under nitrogen pressure of approximately 100 ss.

Subsequently, the samples were heated under constant shear (170 sec$^{-1}$) and periodically the shear was reduced to 85 sec$^{-1}$ for rheological properly measurement. The testing was completed by cooling the sample and measuring a final rheology. The able viscosities are yielded in hydrochloric acid for the acrylamide backbone ampholytes, showing utility as brine and acid viscosifiers. And the N-vinyl pyrrolidone backbone ampholytes generally show utility as a brine and acid viscosifier but to a lesser degree compared to the PAM-ampholytes. Undoubtedly, this N-vinyl-2-pyrrolidone based polyampholyte is both chemically and thermally stable in these solution environments. Furthermore, marked improvement in the rheological properties of these water-based borehole fluids and fracturing fluids is obtained through moderate increases in either (or both) charge density and molecular weight of the polyampholyte. In any case, these properties (see Table I) compared favorably with conventional (and commercially available) water base borehole and fracturing fluids.

TABLE I

| 5#/Bbl High Molecular Weight Polyacrylamide Ampholyte in Tap Water (10563-23A) (860-10.1) | | |
|---|---|---|
| Time (Min) | Temp (°F.) | Viscosity @ 170 Sec$^{-1}$ |
| 0 | 75 | 11 |
| 27 | 150 | 7 |
| 60 | 150 | 7 |
| 90 | 250 | 4 |
| 115 | 75 | 11 |

TABLE II

| 5#/Bbl, HMW-PAM-AMPH, in 10 PPG NaCl | | |
|---|---|---|
| Time (Min) | Temp (°F.) | Viscosity # 170 Sec$^{-1}$ |
| 0 | 75 | 67 |
| 30 | 150 | 24 |
| 60 | 150 | 16 |
| 75 | 250 | 11 |
| 190 | 250 | 9 |
| 175 | 75 | 54 |

TABLE III

| 5#/Bbl, HMW-PAM-AMPH in 11.6 PPG CaCl₂ | | |
|---|---|---|
| Time (Min) | Temp (°F.) | Viscosity @ 170 Sec⁻¹ |
| 0 | 75 | 198 |
| 9 | 125 | 157 |
| 15 | 175 | 120 |
| 18 | 200 | 111 |
| 22 | 225 | 97 |
| 27 | 250 | 87 |
| 32 | 275 | 79 |

TABLE IV

| 5#/Bbl, HMW-PAM-AMPH in 15.1 HCl | | |
|---|---|---|
| Time (Min) | Temp (°F.) | Viscosity @ 170 Sec⁻¹ |
| 0 | 75 | 39 |
| 18 | 150 | 23 |
| 46 | 150 | 16 |
| 62 | 150 | 15 |
| 90 | 75 | 23 |

TABLE V

| 5#/Bbl N—Vinyl Pyrolidone Ampholyte in Tap Water (10563-82A) (860-17.6) | | |
|---|---|---|
| Time (Min) | Temp (°F.) | Viscosity @ 170 Sec⁻¹ |
| 0 | 75 | 8 |
| 15 | 150 | 3 |
| 35 | 150 | 2 |
| 47 | 150 | 2 |
| 60 | 150 | 2 |
| 90 | 95 | 8 |

TABLE VI

| 5#/Bbl NVP-Ampholyte in 2% KCl | | |
|---|---|---|
| Time (Min) | Temp (°F.) | Viscosity @ 170 Sec⁻¹ |
| 0 | 75 | 25 |
| 16 | 110 | 15 |
| 125 | 220 | 2 |
| 162 | 75 | 18 |

TABLE VII

| 5#/Bbl NVP-Ampholyte in 11.6 PPG CaCl₂ | | |
|---|---|---|
| Time (Min) | Temp (°F.) | Viscosity @ 170 Sec⁻¹ |
| 0 | 85 | 20 |
| 7 | 120 | 9 |
| 17 | 180 | 2 |
| 26 | 220 | 1 |
| 32 | 110 | 7 |
| 42 | 90 | 13 |
| 53 | 80 | 18 |

TABLE VIII

| 10#/Bbl NVP-Ampholyte in 15% HCl | | |
|---|---|---|
| Time (Min) | Temp (°F.) | Viscosity @ 170 Sec⁻¹ |
| 0 | 75 | 6 |
| 15 | 100 | 0.1 |
| 30 | 100 | 0.1 |
| 75 | 75 | 2 |

What is claimed is:

1. A method of completing a subterranean formation of an oil or gas well to increase the recovery of hydrocarbons from the producing reservoir which comprises dissolving about 0.25 to about 20 lb/bbl of a water soluble terpolymer in an aqueous salt solution to viscosify said aqueous salt solution and pumping said aqueous salt solution with said water base terpolymer dissolved therein into said well to control the subsurface pressures of said well, wherein said terpolymer has the formula:

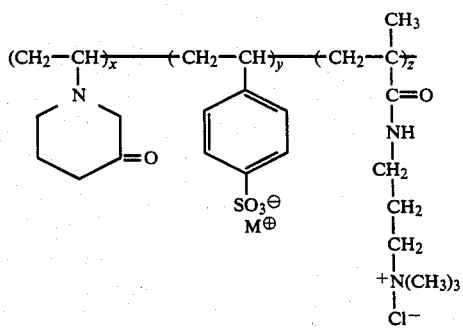

wherein x is about 70 to about 98 mole %, y is about 1 to about 15 mole %, z is about 1 to about 15 mole %, wherein y and z are less than 60 mole %, and M is selected from the group consisting of amines and a metallic cation being selected from the group consisting of lead, iron, aluminum, Groups IA, IIA, IB and II of the Periodic Table of Elements.

2. The method according to claim 1 wherein M is sodium.

3. The method according to claim 1 wherein said aqueous solution is salt water having a concentration of about 0.1 to about 40 wt.% of salt.

4. The method according to claim 1 wherein said terpolymer possesses unequal molar ratio of anionic and cationic units.

5. A method of fracturing a subterranean formation of a gas or oil well which comprises dissolving about 0.25 to about 20 lb/bbl of a water soluble terpolymer into an aqueous salt solution to viscosify said aqueous salt solution and pumping said aqueous salt solution with terpolymer dissolved therein into said well to apply hydraulic pressure to such formation wherein said terpolymer has the formula:

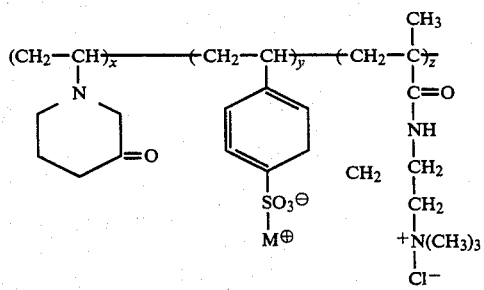

6. The method according to claim 5 wherein M is sodium.

7. The method according to claim 5 wherein said aqueous solution is salt water having a concentration of about 0.1 to about 35 wt.% of salt.

8. The method according to claim 5 wherein said terpolymer possesses unequal molar ratio of anionic and cationic units.

* * * * *